US010974726B2

(12) United States Patent
Lachmann et al.

(10) Patent No.: US 10,974,726 B2
(45) Date of Patent: Apr. 13, 2021

(54) METHOD FOR OPERATING A SELF-PROPELLING ROAD PAVER AND ROAD PAVER THEREFOR

(71) Applicant: VOLVO CONSTRUCTION EQUIPMENT AB, Eskilstuna (SE)

(72) Inventors: Oliver Lachmann, Hameln (DE); Christian Ortlieb, Hessisch Oldendorf (DE)

(73) Assignee: Volvo Construction Equipment AB, Eskilstuna (SE)

( * ) Notice: Subject to any disclaimer, the term of this patent is extended or adjusted under 35 U.S.C. 154(b) by 161 days.

(21) Appl. No.: 15/761,442

(22) PCT Filed: Sep. 13, 2016

(86) PCT No.: PCT/EP2016/001539
§ 371 (c)(1),
(2) Date: Mar. 20, 2018

(87) PCT Pub. No.: WO2017/050423
PCT Pub. Date: Mar. 30, 2017

(65) Prior Publication Data
US 2019/0047569 A1 Feb. 14, 2019

(30) Foreign Application Priority Data
Sep. 23, 2015 (DE) ...................... 10 2015 012 298.3

(51) Int. Cl.
*E01C 23/14* (2006.01)
*B60W 30/188* (2012.01)
(Continued)

(52) U.S. Cl.
CPC ........ *B60W 30/1882* (2013.01); *B60W 10/06* (2013.01); *B60W 10/08* (2013.01);
(Continued)

(58) Field of Classification Search
CPC .................................................. E01C 2301/10
(Continued)

(56) References Cited

U.S. PATENT DOCUMENTS

| 6,124,580 A  * | 9/2000 | Nottmeier | ............. | E01C 19/407 |
| | | | | 219/618 |
| 8,636,442 B1 * | 1/2014 | Sopko, Jr. | ................ | E01C 19/48 |
| | | | | 404/118 |

(Continued)

FOREIGN PATENT DOCUMENTS

| DE | 3911401 C1 | 3/1990 |
| DE | 19912248 A1 | 9/2000 |

(Continued)

OTHER PUBLICATIONS

International Search Report (dated Nov. 16, 2016) for corresponding International App. PCT/EP2010/001539.

*Primary Examiner* — Gary S Hartmann
(74) *Attorney, Agent, or Firm* — Sage Patent Group

(57) ABSTRACT

A method for operating a road paver that is self-propelled and may be controlled via a machine controller. An internal combustion engine provides engine power for a hydraulic system and for a generator so as to generate a generator power for supplying at least one electrical screed plate heating system with electrical energy. The engine and generator power are changed via an engine controller and also a generator controller. Prior to and/or during the paving procedure, current measurements are performed on the current that is flowing between an electrical screed plate heating system, which is dimensioned in a frequency-independent manner, and the generator, in order to determine and ascertain a prevailing generator power that is drawn off at least by the electrical screed plate heating system.

19 Claims, 2 Drawing Sheets

(51) Int. Cl.
*B60W 10/06* (2006.01)
*B60W 10/08* (2006.01)
*E01C 19/48* (2006.01)

(52) U.S. Cl.
CPC ......... *E01C 19/48* (2013.01); *B60W 2300/17* (2013.01); *B60W 2510/087* (2013.01); *B60W 2510/305* (2013.01); *E01C 2301/10* (2013.01); *Y02T 10/40* (2013.01); *Y02T 10/84* (2013.01)

(58) Field of Classification Search
USPC .......................................................... 404/95
See application file for complete search history.

(56) References Cited

U.S. PATENT DOCUMENTS

| | | | | |
|---|---|---|---|---|
| 8,784,003 | B2* | 7/2014 | Heindtel | E01C 19/48 404/108 |
| 9,234,931 | B2* | 1/2016 | Lindsey | E01C 19/22 |
| 9,811,952 | B2* | 11/2017 | Carlson | E01C 19/22 |
| 10,053,822 | B2* | 8/2018 | Eul | E01C 19/22 |
| 2006/0045624 | A1* | 3/2006 | Nelson | E01C 19/407 404/95 |
| 2018/0282952 | A1* | 10/2018 | Buschmann | E01C 19/42 |
| 2019/0257041 | A1* | 8/2019 | Heindtel | B60R 16/03 |
| 2019/0352863 | A1* | 11/2019 | Noll | B60K 11/02 |

FOREIGN PATENT DOCUMENTS

| | | |
|---|---|---|
| DE | 20305577 U1 | 8/2004 |
| DE | 102009031412 A1 | 1/2011 |
| DE | 102010048161 A1 | 7/2011 |
| DE | 102013008032 A1 | 11/2014 |
| EP | 2333158 A1 | 6/2011 |
| EP | 2818675 A1 | 12/2014 |
| WO | 0047821 A1 | 8/2000 |
| WO | 2014124545 A1 | 8/2014 |

* cited by examiner

METHOD FOR OPERATING A SELF-PROPELLING ROAD PAVER AND ROAD PAVER THEREFOR

BACKGROUND AND SUMMARY

The invention relates to a method for operating a road paver that is self-propelled and may be controlled via a machine controller, and a self-propelled road paver for use with said method.

DE 39 11 401 C1 discloses that in the case of a road paver the rotational speed is manually regulated by the driver. When the road paver is being transported and transferred to another location, the power of the diesel engine is primarily used for the drive. Different driving situations are taken into account by the driver by means of continually regulating the rotational speed of the diesel engine. However, when performing the paving operation the diesel engine runs at the nominal rotational speed. The driver does not perform any adjustments because he does not know the actual power requirement and he must avoid the situation where operating units that are required are not supplied with the required power during interruptions. The environment is unnecessarily harmed as a result of noise and exhaust gases.

In order to reduce the negative impact on the environment and to reduce the consumption of energy at least during interruptions of the paving operation, in accordance with DE 39 11 401 C1 the rotational speed of the diesel engine is automatically adjusted to the power requirement of the operating units during the interruption of the paving operation. The adjustment may be performed in such a manner that a rotational speed is set at a value between the nominal rotational speed and the idle running rotational speed. The generator for supplying current to the screed plate heating system may be designed in such a manner that said generator does not require the nominal rotational speed in order to supply the screed plate heating system but rather requires a lower rotational speed. If the generator that is supplying the heating system is already providing sufficient electrical power when at a rotational speed that is lower than the nominal rotational speed, the rotational speed only needs to be increased to this value. However, the disadvantage is that the potential savings are only low if the continual operational readiness of the road paver is not to be jeopardized.

WO 00/47821 A1 and DE 10 2013 008 032 A1 in each case disclose a method and a device for electrically heating a paver screed. A heating resistor of the paver screed draws electrical power for this purpose from a generator. The electrical power of the generator may be varied by means of changing an excitation voltage at the generator. The excitation voltage may be increased or reduced via a closed-loop control procedure in dependence upon signals of a temperature sensor that measures the temperature at the paver screed, in order to increase or reduce the heating procedure at the paver screed. A desired temperature value may be stored in an electronic closed-loop control unit for the closed-loop control procedure and may be adjusted to suit the respective task. The change in the generator voltage renders it possible to reduce the outlay with regard to the devices since circuit breakers for switching the generator on and off may be omitted. However, the disadvantage is that a significant saving in fuel is not achieved.

WO 2014/124545 A1 also discloses changing the heating power of the electrical heating element or heating elements so as to heat a paving screed unit of a road paver by virtue of the fact that the electrical voltage that is supplied to the electrical heating elements is changed. This is achieved by virtue of the fact that the excitation current of the current generator is changed and/or that the drive rotational speed of the current generator is changed. The generator may run in the nominal load operating mode, part load operating mode or overload operating mode. The driving motor may be constantly loaded by virtue of changing the excitation current, as a result of which said motor is rested and moreover fuel is saved in the case of an internal combustion engine. However, there is also here the disadvantage that a significant saving in fuel is not achieved. Moreover, information regarding heating errors at the paving screed unit are only provided via the temperature sensors with the result that paving errors may occur.

It is desirable to provide a method for operating a self-propelled road paver and a road paver for use with said method, said method and road paver making it easier to utilize the possibilities for saving energy while enhancing the operational readiness of the road paver.

As a consequence, a method and a road paver are provided, wherein, prior to and/or during the paving procedure, current measurements are performed on the current that is flowing between an electrical screed plate heating system, which is dimensioned in a frequency-independent manner, and the generator in order to determine and ascertain a prevailing generator power that is drawn off at least by the electrical screed plate heating system.

In accordance with an aspect of the invention, a generator power requirement is therefore determined. For this purpose, a machine controller of the road paver receives measured values of the output current of the generator from a current measuring device. In the case of a selected desired voltage value of the output voltage of the generator, the output current is a measurement for the electrical power that is drawn off at the generator.

The possibility of feedback is provided by means of transmitting the output current of the generator to the machine controller, said feedback by way of example rendering it possible to check for and to promptly identify errors in the screed plate heating system and/or to dynamically adjust the rotational speed of the internal combustion engine to the electrical power that is currently required at the generator. The screed plate heating procedure may also comprise heating the compactor, which is typically arranged ahead of a base plate, in addition to heating the base plate.

Moreover, it is possible by means of the current measurement to react in an optimal manner to the greatly varying power consumptions that occur as a result of the possibility of the different widths of paving screed that may be laid. Finally, the time it takes to heat the screed may be reduced by virtue of the possibility of operating at a voltage that is increased with respect to a nominal voltage.

The rotational speed of the internal combustion engine may be adjusted to the ascertained generator power requirement whilst taking into account the consumption-optimal engine characteristic diagram of the internal combustion engine. The operating point of the internal combustion engine may be displaced along the demand-related power hyperbola in the engine characteristic diagram towards a lower minimum rotational speed. Rotational speeds that are as low as possible of the internal combustion engine are used for operating points of the internal combustion engine that comprise an advantageous specific fuel consumption. Since the reducing rotational speed is compensated by means of an increasing torque, a lower minimum rotational speed is determined by means of the torque that may still be transmitted to the coupled generator without a slippage occurring when using by way of example a V-belt.

The reduction in the rotational speed of the internal combustion engine for the drives of the hydraulic system may be compensated for by means of hydraulic pumps having variable volumetric displacement in order to be able to generate a constant volume flow, as disclosed by way of example in DE 10 2009 031 412 A1.

A procedure that is preferably performed so as to control in a closed-loop manner the output voltage of the generator to a selectable desired voltage value simultaneously effects the reliable provision of the required electrical power whilst the rotational speed is being set. In the case of the adjusted rotational speed, the power that may be provided by the internal combustion engine is tailored to the actual power requirement of electrical components, at least of the electrical screed plate heating system, in particular prior to a paving procedure or during paving procedure interruptions.

Further embodiments of the invention are evident in the following description and the dependent claims.

BRIEF DESCRIPTION OF THE DRAWINGS

The invention is further explained below with reference to the exemplary embodiment that is illustrated in the attached drawings.

DETAILED DESCRIPTION

Figure 1:
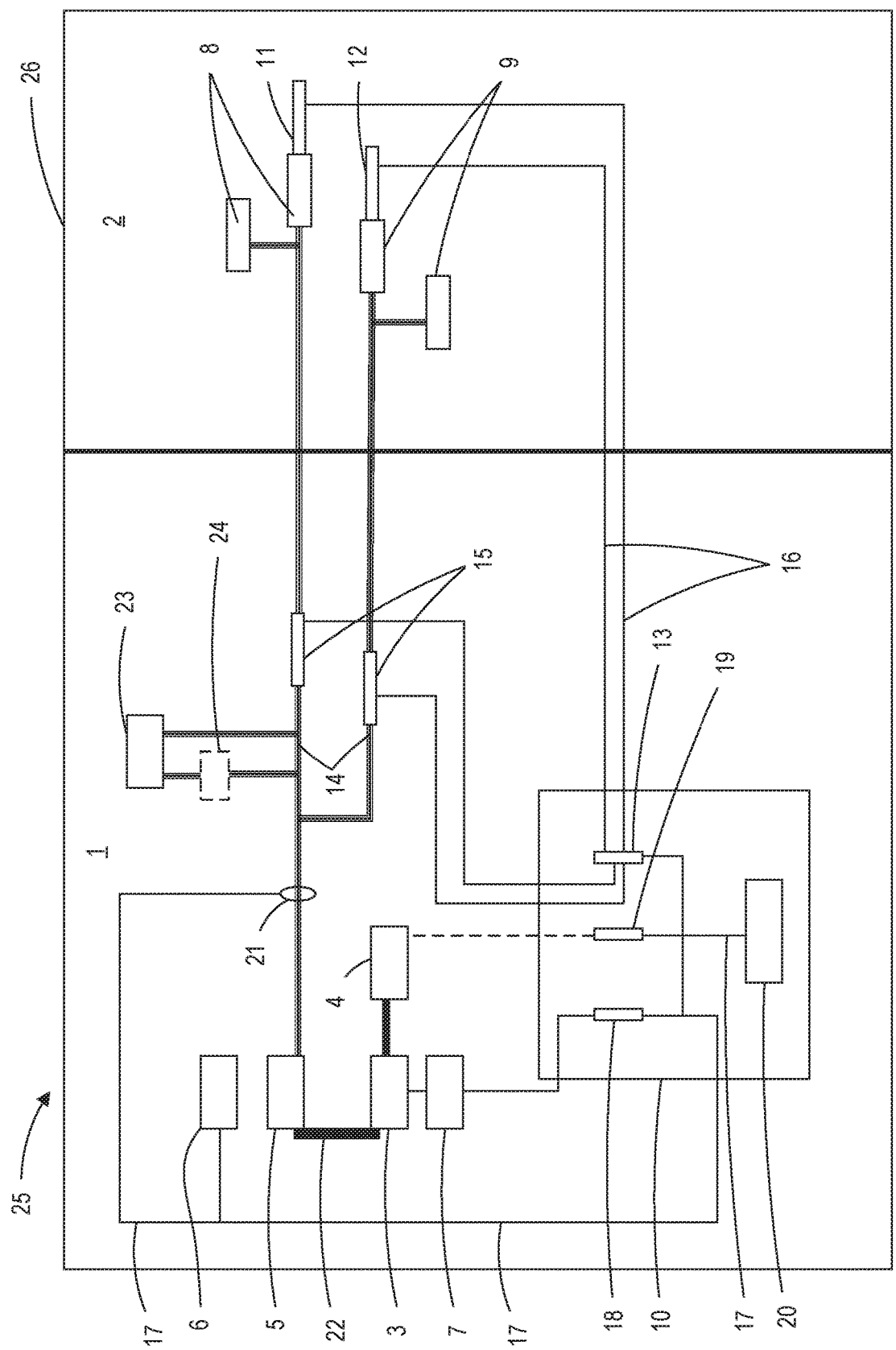
FIG. 1 illustrates a block diagram of an open-loop and closed-loop control system for operating a road paver in accordance with an exemplary embodiment of the invention.
Figure 2:
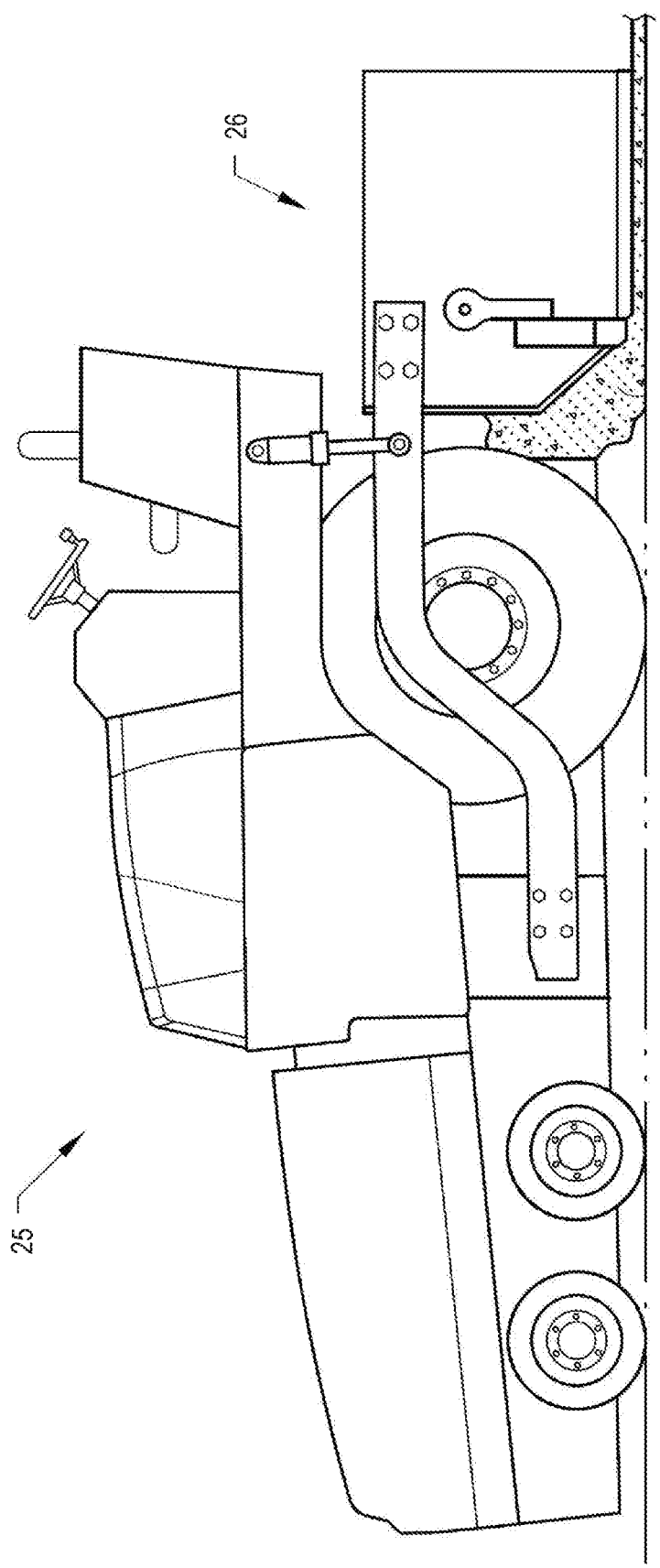
FIG. 2 illustrates the road paver of FIG. 1.

The invention relates to a method for operating a self-propelled road paver 25, and an open-loop and closed-loop control system is installed on the road paver 25 for this purpose, as is illustrated in FIG. 1. The road paver 25, which is further illustrated in FIG. 2, comprises in a known manner a tractor 1 and a paving screed unit 2 for laying a road surface of bituminous mix. The road paver 25 comprises as a primary drive unit an internal combustion engine 3 that provides the engine power for drives of a hydraulic system 4 and for a generator 5 to generate an electrical power. The generator 5 supplies at least one electrical screed plate heating system 26 of the paving screed unit 2 of the road paver 25 with electrical energy with the result that said screed plate heating system 26 produces heat. The screed plate heating system 26 preferably heats a base plate and compactor of the paving screed unit 2. The electric screed plate heating system 26 preferably comprises multiple groups of heating elements 8, 9 that are provided here in each case as electrical resistor heating elements and are integrated into the paving screed unit 2. The electrical screed plate heating system 26 is dimensioned in accordance with the invention in a frequency-independent manner by way of example by virtue of the fact that the resistor heating elements here are ohmic resistors. The installation locations of the heating elements 8, 9 may relate to the different functional components of the paving screed unit 2 such as the base plate, compactor etc.

The heating power of the heating elements 8, 9 is set or controlled in a closed-loop manner via a computer-supported machine controller 10, wherein temperature sensors 11, 12 measure the temperature in particular at the heating element 8, 9 or at the paving screed unit 2. A desired temperature value may be provided for the closed-loop control procedure in an electronic closed-loop control unit 13 of the machine controller 10 and may be adjusted to the respective paving situation. The closed-loop control unit 13 is connected for this purpose via lines 16 to the temperature sensors 11, 12.

The heating elements 8, 9 are supplied with electrical power from the generator 5 via a current circuit 14. The generator 5 provides generator power that is converted at least by the screed plate heating system 26 into thermal energy. The generator 5 is preferably a 3-phase generator and its output voltage may be selected via a generator controller 6. The voltage that is made available at the output of the generator 5 may be changed by means of changing the excitation voltage. The heating elements 8, 9 may be switched on or off via circuit breakers 15. The output voltage of the generator 5 may be set or controlled in a closed-loop manner via the computer-supported machine controller 10, which is why the generator controller 6 communicates via a data bus 17 with the machine controller 10. Moreover, the closed-loop control unit 13 for setting the heating power and also a closed-loop control unit 18 for an engine controller 7 of the internal combustion engine 3 and where appropriate a closed-loop control unit 19 for the hydraulic system 4 are connected to the data bus 17. In addition to the closed-loop control units 13, 18, 19, an operating terminal 20 for operating and display functions is associated with the machine controller 10.

Moreover, a current measuring device 21 is connected to the data bus 17 and is provided so as to measure the output current of the generator 5 in the current circuit 14 of the generator 5 having the screed plate heating system 26 or its heating elements 8, 9, and said current measuring device communicates with the machine controller 10 via the data bus 17. The current measurement may be performed continuously or at discrete points in time, namely prior to and/or during the paving procedure. The current measuring device 21 may be structurally integrated into the generator controller 6.

The intended aim of measuring the current is to reduce and maintain as low as possible rotational speeds of the internal combustion engine whilst utilizing nominal states and limit states of the generator 5 that is coupled to the internal combustion engine 3, said generator supplying at least the electrical screed plate heating system 26, and doing so preferably in conjunction with or as an alternative to identifying a malfunction for the electrical screed plate heating system 26. The reason for this is that defective ohmic resistors as heating elements 8, 9 reduce the current flow with respect to a desired value and render it possible by means of a current measurement to promptly identify an error, even prior to the temperature falling below a desired temperature value of the paving screed unit.

The nominal voltage for the ohmic resistors of the heating elements 8, 9 is typically 230 V. A temporary operation that is in particular dependent upon the requirement for heat is possible at a lower or a higher voltage. The current consumption is proportional to the voltage that is applied. The heating power that is output is in quadratic proportion to the voltage that is applied.

The generator 5 is preferably mechanically connected to the internal combustion engine 3 via a generator belt 22. Alternatively, the connection may be realized via a transmission gearing.

In accordance with the method in accordance with the invention for operating the road paver 25 that is self-propelled and may be controlled via the machine controller 10, it is therefore provided that the internal combustion engine 3 provides engine power for drives of the hydraulic system 4 and for the generator 5 so as to generate a generator power for supplying at least the electrical screed plate heating system 26 with electrical energy, and the engine and generator power are changed via the engine controller 7 and also the generator controller 6. Prior to and/or during the paving procedure, current measurements are performed on the current that is flowing between the electrical screed plate heating system 26, which is dimensioned in a frequency-independent manner, and the generator in order to determine and ascertain a prevailing generator power that is drawn off at least by the electrical screed plate heating system 26 or its heating elements 8, 9.

The ascertained actual variable of the generator power requirement may be input into the machine controller 10 as a state variable in order to perform a check regarding the availability of the electrical screed plate heating system 26. An engine power that may be provided by the internal combustion engine 3 may be adjusted based upon a power difference between the ascertained generator power requirement and the engine power that may be provided, and the operating point of the internal combustion engine 3 may be displaced along the demand-related power hyperbola in the engine characteristic diagram towards a lower minimum rotational speed in the case of a torque that may be transmitted to the coupled generator 5. The power that is consumed by the generator 5 is known by means of the current measurement with the result that the engine output power may be adjusted to a lower engine output power than the possible maximum without the risk of the internal combustion engine 3 stalling. A lowest possible rotational speed of the internal combustion engine 3 renders it possible to reduce the noise emission and the fuel consumption.

The generator belt 22 may typically only transmit a limited torque without a slippage and subsequent destruction. If a high heating power is required and the highest permissible torque has already been reached, more power is to be transmitted by means of increasing the lower minimum rotational speed. The heating power is known in accordance with the invention by means of the current measurement with the result that it is no longer necessary always to start from the highest conceivable power, as would be the case if the heating power was not known.

Moreover, it is possible during the paving procedure to take into account an engine power requirement of the hydraulic system 4.

An output voltage of the generator 5 may be set to a desired voltage value that may be selected. The interior temperature of the generator may be measured and input into the machine controller 10 as a state variable in order to avoid the generator 5 overheating as a result of the rotational speed of the internal combustion engine 3 increasing.

The generator power may finally also be used for other electrical components and/or to charge an electrical energy storage device 23, and the electrical screed plate heating system 26 may be selectively supplied from said energy storage device. An inverter 24 that is suitable for this purpose may be provided in order to convert the three-phase current into direct current.

The desired voltage value of the generator controller 6 may be predetermined by the machine controller 10 via the data bus 17. As a consequence, in dependence upon the desired voltage value, continuous control is achieved over the power that is drawn off at the generator 5. In particular, the desired voltage value may be reduced whilst setting the adjusted rotational speed to a lower second desired voltage value. As a consequence, the power reserve of the internal combustion engine 3 is increased so as to set the adjusted rotational speed and the timespan that is required for the setting procedure is reduced.

It is preferred that the output voltage of the generator 5, said output voltage being measured by the generator controller 6, is supplied to the machine controller 10. In this case, the machine controller 10 may calculate the actual power that is being drawn off using the real-time data relating to the output voltage and output current and simultaneously may monitor the closed-loop control of the output voltage by means of the generator controller 6. A closed-loop controller of the generator is preferably provided for the generator controller 6.

The minimum rotational speed that is required may also be codetermined by means of a permissible highest temperature of the generator 5. For this purpose, a temperature sensor (not illustrated) of the generator 5 preferably monitors an interior temperature of the generator. The procedure of using the generator 5 to generate the electrical power that is actually drawn off produces increasingly more heat in the interior of the generator 5 the lower the rotational speed and the higher the torque at which the mechanical power is provided. The procedure of determining the required minimum rotational speed by means of monitoring the interior temperature of the generator renders it possible to minimize the rotational speed whilst simultaneously protecting the generator 5 against overheating. The generator 5 consequently preferably comprises a temperature sensor (not illustrated) and the measured temperature value from said temperature sensor may be transmitted via the data bus 17 to the machine controller 10.

As already mentioned above, the required minimum rotational speed is determined by virtue of a limit value for the slippage value of the generator drive. The slippage value may be calculated by the machine controller 10 from the ratio of the rotational speeds of the generator 5 and the internal combustion engine 3 and said rotational speeds may be transmitted via the data bus 17 to the machine controller 10 from rotational speed measuring devices (not illustrated). In the case of a slippage value being above a predetermined limit value, the maximum torque that may be transmitted by the generator drive is exceeded. The procedure of determining the required minimum rotational speed by means of monitoring the slippage value renders it possible to consequently minimize the rotational speed whilst simultaneously protecting the generator drive against being overloaded.

The self-propelled road paver 25 that is provided in accordance with the invention is accordingly fitted with an internal combustion engine 3, which drives the hydraulic system 4 and the generator 5, in order to supply at least one electrical screed plate heating system 26, and is fitted with an engine controller 7 and a generator controller 6 that are connected to the machine controller 10 for a paving operation. Moreover, the current measuring device 21 is provided in the current circuit of the generator 5 so as to measure the output current of the generator 5, said current circuit having the electrical screed plate heating system 26, which is dimensioned in a frequency-independent manner, and the current measuring device 21 is connected via the data bus 17 to the machine controller 10. The machine controller 10 is designed so as to implement the above-described method for operating the road paver 25.

A lowest possible rotational speed of the internal combustion engine 3 for reducing the noise emission also reduces the frequency of the multiphase alternating current that the generator 5 converts from the mechanical power of the internal combustion engine 3. However, the ohmic resistors of the heating elements 8, 9 operate in a frequency-independent manner with the result that the reduction of the rotational speed of the internal combustion engine 3 may be optimized together with optimizing the energy provision for the heating elements 8, 9 since the power consumption of the electrical consumers, in particular the heating elements 8, 9 or the screed plate heating system 26, is determined and ascertained by means of the current measurement by means of the current measuring device 21.

The invention claimed is:

1. A method of operating a self-propelled road paver comprising:
    providing, by an internal combustion engine, engine power to a hydraulic system and to a generator to generate power;
    supplying, by the generator, at least one frequency-independent electrical screed plate heating system with electrical energy comprising a three-phase current;
    measuring, during a paving procedure by the road paver, a current value of the three-phase current flowing between the electrical screed plate heating system and the generator; and
    determining a prevailing generator power being drawn off by the electrical screed plate heating system.

2. The method as claimed in claim 1, further comprising inputting an ascertained actual variable of a generator power requirement as a state variable into a machine controller to determine an availability of the electrical screed plate heating system.

3. The method as claimed in claim 1, further comprising:
    adjusting an engine power provided by the internal combustion engine based upon a power difference between an ascertained generator power requirement and the engine power being provided, and
    displaying an operating point of the internal combustion engine along a demand-related power hyperbola in an engine characteristic diagram towards a lower minimum rotational speed in the case of a torque that may be transmitted to the coupled generator.

4. The method as claimed in claim 1, further comprising:
    setting an output voltage of the generator to a desired voltage value.

5. The method as claimed in claim 1, further comprising:
    adjusting an engine power provided during the paving procedure based on an engine power requirement of the hydraulic system.

6. The method as claimed in claim 1, further comprising:
    measuring an interior temperature of the generator;
    inputting the interior temperature of the generator into a machine controller as a state variable; and
    limiting, based on the state variable, a rotational speed of the internal combustion engine to avoid the generator overheating.

7. The method as claimed in claim 1, further comprising:
    charging an electrical energy storage device using generator power; and
    selectively supplying power to the electrical screed plate heating system from the energy storage device.

8. The method of claim 7, wherein charging the electrical energy storage device further comprises:
    converting the three-phase current of the electrical energy to a direct current; and
    charging the electrical energy storage device with the direct current, and
    wherein selectively supplying power to the electrical screed plate heating system from the energy storage device further comprises:
    converting a direct current of the power from the energy storage device to a three-phase current; and
    supplying the three-phase current to the electrical screed plate heating system.

9. The method as claimed in claim 1, wherein a screed unit of the electrical screed plate heating system comprises at least one ohmic resistor, and
    wherein the screed unit further comprises at least one temperature sensor to measure a screed unit temperature of the screed unit.

10. The method of claim 1, further comprising:
    selectively generating, by at least one frequency-independent heating element of the electrical screed plate heating system, heat based on the current value of the electrical energy flowing between the screed plate heating system and the generator, and independently of a frequency value of the electrical energy, to optimize energy provision for the at least one frequency-independent heating element.

11. A self-propelled road paver having comprising:
    an internal combustion engine;
    a hydraulic system;
    a current circuit comprising:
        a generator;
        at least one frequency-independent electrical screed plate heating system; and
        a current measuring device to measure a current value of a three-phase current being supplied by the generator to the electrical screed plate heating system, wherein the current measuring device is connected via a data bus to a machine controller.

12. The road paver as claimed in claim 11, wherein the machine controller is configured to:
    determine, based on the current value of the three-phase current, an availability of the electrical screed plate heating system.

13. The road paver as claimed in claim 11, wherein the machine controller is configured to:
    determine, via the current measuring device, a generator power requirement at least of the electrical screed plate heating system;
    communicate rotational speed specifications to an engine controller connected to the machine controller based on the generator power requirement to drive the generator in a slip-free manner by the internal combustion engine.

14. The road paver as claimed in claim 11, wherein the generator comprises a temperature sensor to measure a temperature value of the generator, wherein the data bus is configured to transmit the temperature value to the machine controller.

15. The road paver as claimed in claim 11, further comprising at least one rotational speed measuring device to determine a rotational speed value of the internal combustion engine and transmit the rotational speed value via the data bus to the machine controller.

16. The road paver as claimed in claim 11, further comprising an energy storage device connected to the generator to selectively supply the electrical screed plate heating system with energy.

17. The road paver as claimed in claim 11, wherein the electrical screed plate heating system comprises a screed unit comprising:
    at least one ohmic resistor; and
    at least one temperature to measure a screed unit temperature of the screed unit.

18. The road paver as claimed in claim 11, further comprising at least one of a V-belt or a transmission gearing coupled between the generator and the internal combustion engine.

19. The road paver of claim 11, wherein the electrical screed plate heating system further comprises at least one frequency-independent heating element to selectively generate heat based on a current value of the three-phase current being supplied by the generator to the electrical screed plate heating system, and independently of a frequency value of the three-phase current to optimize energy provision for the at least one frequency-independent heating element.

* * * * *